United States Patent [19]

Zboril et al.

[11] Patent Number: 4,777,229

[45] Date of Patent: Oct. 11, 1988

[54] REDUCTION OF ISOMERIZATION IN SOLUTION PROCESS FOR POLYMERIZATION OF ALPHA-OLEFINS

[75] Inventors: Vaclav G. Zboril, Kingston; Ronald A. Zelonka, Oakville, both of Canada

[73] Assignee: Du Pont Canada Inc., Mississauga, Canada

[21] Appl. No.: 95,689

[22] Filed: Sep. 14, 1987

Related U.S. Application Data

[63] Continuation-in-part of Ser. No. 824,353, Jan. 23, 1986, abandoned.

[51] Int. Cl.$^4$ ............................ C08F 2/42; C08F 10/02
[52] U.S. Cl. ..................................... 526/84; 526/348.6
[58] Field of Search .......................................... 526/84

[56] References Cited

FOREIGN PATENT DOCUMENTS

| | | | |
|---|---|---|---|
| 1173599 | 8/1984 | Canada ................................. | 526/84 |
| 116917 | 8/1984 | European Pat. Off. ............... | 526/84 |
| 55-147509 | 11/1980 | Japan .................................. | 528/491 |
| 898930 | 6/1962 | United Kingdom ................. | 528/491 |

*Primary Examiner*—Edward J. Smith

[57] ABSTRACT

A solution polymerization process for the preparation of high molecular weight polymers selected from the group consisting of homopolymers of ethylene and copolymers of ethylene and butene-1 is disclosed. The process comprises feeding monomer(s), coordination catalyst and inert hydrocarbon solvent to a reactor, polymerizing the monomers at a temperature of up to 320° C. and a pressure of less than 25 MPa, and deactivating the catalyst in the solution so obtained. The catalyst is deactivated by sequentially admixing therewith a minor amount of dimethyl carbonate followed by a solution of a salt of an alkaline earth metal or zinc and an aliphatic monocarboxylic acid dissolved in hydrocarbon solvent. The hydrocarbon solvent and other volatile matter are then separated from the resultant solution and a composition comprising the high molecular weight polymer is recovered. The amount of dimethyl carbonate is not more than 2.5 moles, per mole of halogen plus alkyl radicals in the coordination catalyst.

4 Claims, No Drawings

REDUCTION OF ISOMERIZATION IN SOLUTION PROCESS FOR POLYMERIZATION OF ALPHA-OLEFINS

RELATED PATENT APPLICATION

This application is a continuation-in-part of our patent application Ser. No. 824,353, filed Jan. 23, 1986, now abandoned.

BACKGROUND OF THE INVENTION

1. Field of the Invention

The present invention relates to a solution process for the homopolymerization of ethylene and the copolymerization of ethylene and butene-1 and especially to such a process in which there is a reduced tendency for isomerization of any butene-1 fed to the process. In particular the present invention relates to such reduction of isomerization in a solution polymerization process in which deactivated catalyst is not separated from the polymer.

2. Description of the Prior Art

Polymers of ethylene, for example, homopolymers of ethylene and copolymers of ethylene and higher alpha-olefins, are used in large volumes for a wide variety of end uses, for example, in the form of film, fibres, moulded or thermoformed articles, pipe, coatings and the like.

Processes for the preparation of, in particular, copolymers of ethylene and higher alpha-olefins are known. Such processes include processes in which the monomers are polymerized in the presence of a coordination catalyst, for example, a catalyst comprising a compound of a transition metal belonging to Groups IVB-VIB of the Periodic Table and an organometallic compound of a metal belonging to Groups I-IIIA of the Periodic Table.

A particularly preferred process for the polymerization of alpha-olefins is the high temperature or "solution" polymerization process, an example of which is described in Canadian Pat. No. 660 869 of A. W. Anderson, E. L. Fallwell and J. M. Bruce, which issued Apr. 9, 1963. In a solution process the process parameters are selected in such a way that both the monomer and polymer are soluble in the reaction medium. Under such conditions accurate control over the degree of polymerization, and hence the molecular weight of the polymer obtained, may be achieved, for example, by control of the reaction temperature. Solution processes are also disclosed in Canadian Pat. Nos. 1 171 065 of V. G. Zboril, M. A. Hamilton and R. W. Rees, and 1 171 066 of V. G. Zboril and M. A. Hamilton, both issued July 17, 1984, and 1 220 189 of M. A. Hamilton, D. A. Harbourne, C. G. Russell, V. G. Zboril and R. Mulhaupt, issued Apr. 07, 1987.

The polymerization reaction in a solution polymerization process is normally terminated by addition of a so-called "deactivator". A wide variety of compounds are capable of deactivating coordination catalysts, especially at the high temperatures used in a solution polymerization process. However, a deactivator must meet other, more stringent, criteria in order to be acceptable for use in a commercial process. If the deactivated catalyst remains in the polymer, the deactivator and deactivated catalyst residues must not cause problems in the separation of polymer from solvent and unreacted monomers, in the processing of the polymer obtained and in the resultant fabricated articles, and the polymer obtained must have commercially-acceptable colour, odour and toxicity properties. It is particularly difficult to predict the possible effects of a potential deactivator at the high temperatures of a solution process, especially with regard to isomerization of comonomers, degradation of the deactivator, generation of coloured species, reaction with antioxidants and other stabilizers and the like. Moreover, the behavior of the deactivator may be quite sensitive to changes in the operation of a solution process.

Deactivators for solution polymerization processes are known, for example, a fatty acid or an alcohol. The fatty acid is admixed with hydrocarbon solvent, normally the solvent of the polymerization process, and fed into the polymerization mixture, usually shortly after that mixture passes from the reactor. The polymerization mixture that has been treated with deactivator contains catalyst residues which may be removed by contacting the mixture with an adsorbent, for example, alumina. Such a deactivation and catalyst removal process is described in Canadian Pat. No. 732 279 of B. B. Baker, K. M. Brauner and A. N. Oemler, which issued Apr. 12, 1966.

Coordination catalysts containing vanadium may conveniently be deactivated by contacting the polymerization mixture with a solution of a salt of an alkaline earth metal or zinc and an aliphatic monocarboxylic acid dissolved in the hydrocarbon solvent used in the polymerization process. Such deactivation of coordination catalysts containing vanadium tends to result in polymer of improved colour, as is disclosed in Canadian Pat. No. 1 165 499 of V. G. Zboril, which issued Apr. 10, 1984. Titanium-based coordination catalysts used in a solution polymerization process may be deactivated to give polymer of improved colour by sequentially contacting the polymerization mixture with a minor amount of water and then with a solution of a salt of an alkaline earth metal or zinc and an aliphatic monocarboxylic acid dissolved in a hydrocarbon solvent, preferably the solvent used in the polymerization process, as is disclosed in Canadian Pat. No. 1 173 599 of M. A. Hamilton, D. A. Harbourne and V. G. Zboril, which issued Aug. 28, 1984.

The use of carbon dioxide and/or carbon monoxide to deactivate coordination catalysts is disclosed in U.S. Pat. No. 4,211,863 of M. P. McDaniel, J. D. Hottovy and M. B. Welch, which issued July 08, 1980, and in Japanese Patent Application No. 56/074 109 of Mitsubishi Petrochemical, published June 19, 1981. The use of a variety of deactivators, including water, esters, carbon dioxide, carbon monoxide and other organic compounds, to overcome difficulties associated with the use of alkali and/or alkaline earth metal salts of saturated fatty acids, aromatic carboxylic acids or zinc stearate in a high-pressure Ziegler polymerization process in disclosed in published European patent application No. 116 917 of Ruhrchemie, published Aug. 29, 1984.

SUMMARY OF THE INVENTION

It has now been found that the level of isomerization of butene-1 that may occur on sequential deactivation of a coordination catalyst using water and a salt of an alkaline earth metal or zinc and an aliphatic monocarboxylic acid may be reduced by contacting the coordination catalyst with a minor amount of dimethyl carbonate, instead of water, prior to contacting the catalyst with the above salt. Such a deactivation process may also be used in the absence of butene-1 e.g. in the polymerization of ethylene. Polymer of acceptable colour is obtainable.

Accordingly the present invention provides a solution polymerization process for the preparation of high molecular weight polymers of alpha-olefins selected from the group consisting of homopolymers of ethylene and copolymers of ethylene and butene-1, said process comprising feeding monomer selected from the group consisting of ethylene and mixtures of ethylene and butene-1, a coordination catalyst and inert hydrocarbon solvent to a reactor, said catalyst being a coordination catalyst formed from a mixture of titanium tetrachloride and vanadium oxytrichloride, polymerizing said monomer under solution polymerization conditions at a temperature of 105°–320° C. and a pressure of less than 25 MPa, deactivating the catalyst in the solution so obtained by sequentially admixing therewith (a) a minor amount of dimethyl carbonate followed by (b) a solution of a salt of an alkaline earth metal or zinc and aliphatic monocarboxylic acid dissolved in hydrocarbon solvent, separating the hydrocarbon solvent and other volatile matter from the resultant solution and recovering a composition comprising said high molecular weight polymer, the amount of dimethyl carbonate being not more than 2.5 moles of dimethyl carbonate per mole of halogen plus alkyl radicals in the coordination catalyst.

In another embodiment of the process of the present invention, the carboxylic acid is a $C_8$–$C_{10}$ carboxylic acid and the alkaline earth metal is calcium.

DETAILED DESCRIPTION OF THE INVENTION

The present invention is directed to a solution polymerization process for the preparation of high molecular weight polymers of alpha-olefins viz. homopolymers of ethylene and copolymers of ethylene and butene-1.

In the solution polymerization process of the present invention monomer, a coordination catalyst and inert hydrocarbon solvent are fed to a reactor. Coordination catalysts for solution polymerization processes are known, for example those described in the aforementioned Canadian Pat. Nos. 660 869, 1 171 065, 1 171 066 and 1 220 189. Such coordination catalysts may be formed from mixtures of titanium tetrachloride and vanadium oxytrichloride, as is known, especially such mixtures in which the ratio of titanium tetrachloride:vanadium oxytrichloride on a molar basis is in the range 20:80 to 80:20 and in particular 40:60 to 60:40. The monomer is ethylene or a mixture of ethylene and butene-1.

Solution polymerization processes may be operated at temperatures of up to 320° C. and especially in the range of 105°–310° C., the temperature being maintained above the lowest solubilization temperature of the polymer, as will be understood by those skilled in the art of solution polymerization processes. The pressures used in the process of the present invention are those known for solution polymerization processes viz. less than 25 MPa and especially in the range of about 4–25 MPa. The pressure and temperature are controlled so that the unreacted monomers and the polymers formed remain in solution.

The hydrocarbon solvent used in the polymerization process is a hydrocarbon solvent that is inert with respect to the coordination catalyst. Such solvents are known and include hexane, heptane, octane, cyclohexane, methylcyclohexane and hydrogenated naphtha. The solvent used in the polymerization process is preferably also used in the preparation of the coordination catalyst. The hydrocarbon solvent is the major component of the polymerization mixture fed to the reactor, usually comprising at least 60% by weight of the reaction mixture. In the process the monomer is dissolved in the solvent.

The mixture that exits from the polymerization reactor comprises polymer, unreacted monomers, coordination catalyst some of which remains in an active state, and hydrocarbon solvent. A deactivator is added to the mixture to terminate the polymerization process. In the process of the present invention the deactivator is added in two steps.

In the first step, a minor amount of dimethyl carbonate is added to the polymerization mixture. The amount of the dimethyl carbonate added is not more than 2.5 moles per mole of halogen plus alkyl radicals in the coordination catalyst; as used herein a mole of a catalyst component such as diethyl aluminum chloride, as used in the preparation of the catalyst, is deemed to contain two equivalents of ethyl groups and one equivalent of chlorine, the sum of such equivalents being referred to as "moles of halogen plus alkyl groups", and the calculation of the amount of deactivating agent is to be made on such a basis. Preferably 0.25–1.5 moles of dimethyl carbonate are added per mole of halogen plus alkyl radicals in the catalyst.

In the second step the deactivator is a solution of a non-stoichiometric salt of an alkaline earth metal or zinc and aliphatic monocarboxylic acid dissolved in hydrocarbon solvent, especially a salt having excess acid to facilitate solubility. In particular the hydrocarbon solvent used for the deactivator is the same as the solvent used in the polymerization process. If a different solvent is used, it must be compatible with the solvent used in the polymerization process, not cause precipitation of any component of the polymerization mixture and not cause adverse effects on the solvent recovery system associated with the polymerization process.

The salt of the second deactivator solution must be dissolved in the solvent in order to obtain intimate contact between the deactivator and the product of reaction of catalyst with the first deactivator, and to obtain uniform dispersion of the deactivator and catalyst residues i.e. the form of the catalyst after deactivation, throughout the polymer, thereby facilitating the production of polymer of uniform properties.

In the salt of the deactivator solution, the metal is an alkaline earth metal or zinc, especially magnesium or calcium. The remainder of the salt is derived from at least one aliphatic carboxylic acid, especially such an acid having 6 to 20 carbon atoms. In a preferred embodiment the acid has 8 to 12 carbon atoms. The acid is preferably a branched chain aliphatic acid although straight chain aliphatic acids and cycloaliphatic acids may be used. Moreover the acids may be saturated or unsaturated acids. However, the acid must be such that the salt thereof that is used in the process of the present invention is soluble in the hydrocarbon solvent used therein. In preferred embodiments the salt is calcium 2-ethyl hexanoate, calcium naphthenate, calcium isostearate, calcium caprylate, calcium caprate or the like. Preferably the amount of salt added is not more than 2.5 moles per mole of halogen plus alkyl radicals in the catalyst.

In the process of the present invention the deactivated polymerization mixture is fed to a separator, which may be a multistage separator, to separate unreacted monomer, hydrocarbon solvent and any other volatile matter from the polymer. In contrast to the usual practice in a solution process, no steps are taken to remove catalyst residues and/or deactivator from the polymer using adsorbents or other techniques. After separation from solvent and unreacted monomer, the polymer may be extruded into water and cut into pellets or other suitable comminuted shapes.

The recovered polymer may then be treated with saturated steam, optionally admixed with air, at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants and other additives may be added to the polymer either before or after the polymer is initially formed into pellets or other comminuted shapes.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range 0.25:1 to 1:1 with the total amount of antioxidant being in the range of 400 to 2000 ppm.

The use of the dimethyl carbonate as part of the deactivator system of the present invention is important not only with respect to the amount of isomerization of the comonomer but also with respect to the colour of the polymer subsequently obtained and with respect to impurities that might be introduced into the polymerization process. The by-products formed when dimethyl carbonate and the defined salt are used as the deactivator system tend to be of low volatility whereas the by-products formed when organic deactivators are used tend to be aldehydes, ketones, organic acids and the like. Such organic compounds may be difficult to remove in the solvent recycle process associated with the polymerization process. The use of controlled amounts of the deactivating system disclosed herein can result in an improved solution polymerization process.

The polymers produced by the process of the present invention are capable of being fabricated into a wide variety of articles, as is known for homopolymers of ethylene and copolymers of ethylene and higher alpha-olefins.

Unless otherwise noted, in the examples hereinafter the following procedures were used:

The reactor was a 95 ml (depth=15.1 mm, diameter=88.9 mm) pressure vessel fitted with a six-bladed agitator having a diameter of 66.7 mm, a heating jacket, pressure and temperature controllers, three feed lines and an outlet line. The feed lines were located adjacent to the tips of the agitator blades while the outlet line was adjacent to the centre of the agitator. The catalyst precursors and other ingredients were prepared as solutions in cyclohexane which had been purified by being passed through a silica gel bed, stripped with nitrogen and passed through another silica gel bed followed by beds of 4A molecular sieve and of alumina. The monomer(s) was metered directly into the reactor. The rates of feed of the first and second components of the catalyst were adjusted to produce the desired conditions in the reactor.

Two types of experiments were performed:

(a) Measurement of Isomerization

Unless stated to the contrary, ethylene concentrations of about 5% by weight and butene-1 concentrations of about 3% by weight were used in experiments to measure the amount of isomerization.

The effluent from the polymerization reactor was passed through carbon steel tubing of 4.57 mm ID that was heated to 320° C. The hold-up time of the effluent in this tubing was about one minute. The effluent was then fed into a stainless steel tubular reactor of 10.6 mm ID which was maintained at 320° C. The first deactivator was injected concentrically into the middle of the effluent stream at the inlet to the tubular reactor. The second deactivator, a 4.2 mmole solution of calcium 2-ethyl hexanoate, was injected into the effluent stream at the exit to the tubular reactor; the amount of second deactivator was about 0.17 moles of calcium for each mole of chlorine plus alkyl radicals in the catalyst.

The solvent and monomers were flashed off from the treated effluent thus obtained and analyzed for butene-1, cis-butene-2 and trans-butene-2 using gas chromatography. The amount of isomerization, expressed as a percentage, was calculated using the formula:

$$\text{Amount of isomerization} = \frac{\text{Amount of butene-2}}{\text{Amount of butene-1} + \text{butene-2}} \times 100$$

(b) Measurement of Polymer Colour

An ethylene concentration of up to 15 wt. % was used in these experiments. The reactor effluent was passed through 4.57 mm ID tubing heated to a temperature of 296° C. prior to injection of the first deactivator. The hold-up time in the tubing was about 0.2 min. After injection of the first deactivator, the resultant stream was passed through a further length of 4.57 mm ID tubing, which was heated to 320° C., for a hold-up time of about 2.8 min. A second deactivator was then injected into the stream. The deactivated polymer stream thus obtained was maintained at 320° C. for about 1.2 minutes and then flashed into the barrel of a ram extruder heated to about 220° C., the gaseous matter obtained being removed from the extruder. The molten polymer obtained was periodically extruded into a mould having a depth of 1 mm and a diameter of 40 mm and then rapidly cooled to ambient temperature. The plaques thus obtained were then stripped for eight hours with a mixture of saturated steam and air (7:1, by volume) at atmospheric pressure and then dried for 4 hours using air at 100° C. The colour of the plaques was then measured on a Hunter TM L,a,b colourimeter, the measurement being on four plaques stacked in a holder having a black background.

The present invention is illustrated by the following examples. The solvent used in the examples was cyclohexane.

EXAMPLE I

The catalyst was prepared by in-line mixing of (i) a solution of titanium tetrachloride (0.5 mmoles/liter) and vanadium oxytrichloride (0.5 mmoles/liter) in cyclohexane with (ii) a solution of 1.9 mmoles/liter of diethylaluminum chloride in cyclohexane, the atomic ratio of aluminum to titanium plus vanadium being 1.67:1. After about 20 seconds, a stream of hot cyclohexane was injected into the catalyst mixture, the resultant stream having a temperature of 210° C. The stream was maintained at this temperature for one minute.

The catalyst obtained using the above procedure was fed into the reactor. A co-catalyst of triethyl dimethyl siloxalane was also fed to the reactor. The co-catalyst was used as a 4 mmole/liter solution in cyclohexane and the rate of feed to the reactor was the same as that of the above solution of titanium tetrachloride/vanadium oxytrichloride. The monomers were ethylene and butene-1. The reactor effluent was treated as described hereinbefore for experiments for measurement of isomerization. The amount of second deactivator was 0.27 moles of calcium for each mole of chlorine plus alkyl radicals in the catalyst.

The ratio of the moles of first deactivator to moles of chlorine plus alkyl radicals in the catalyst is shown in Table I below; the amount of first deactivator used was based on the results of previous experimental work to optimize the colour of polymer obtained using each first deactivator.

The first deactivators used and the colour of the resultant polymers are shown in Table I. Of the Runs shown in Table I, only Runs 4, 9 and 11 are runs of the present invention; the remaining Runs are comparative runs. The runs were carried out in the sequence shown.

TABLE I

| Run No. | First Deactivator | Ratio* | Amount of Isomerization (%) |
|---|---|---|---|
| 1 | none | none | 14 |
| 2 | carbon dioxide | 1.09 | 12 |
| 3 | carbon dioxide | 1.09 | 3 |
| 4 | dimethyl carbonate | 0.35 | 3 |
| 5 | diethyl carbonate | 0.29 | 25 |
| 6 | water | 0.44 | 16 |
| 7 | diethyl carbonate | 0.29 | 13 |
| 8 | carbon dioxide | 0.91 | 9 |
| 9 | dimethyl carbonate | 0.29 | 5 |
| 10 | water | 0.44 | 24 |
| 11 | dimethyl carbonate | 0.29 | 13 |
| 12 | diethyl carbonate | 0.29 | 32 |
| 13 | carbon dioxide | 0.91 | 33 |
| 14 | water | 0.44 | 34 |
| 15 | carbon dioxide | 0.91 | 15 |
| 16 | diethyl carbonate | 0.29 | 14 |

It will be noted that there is significant variation between the results of different runs using the same first deactivator. It is believed that the performance of any particular first deactivator is influenced by a number of factors in the polymerization process, including the nature of the previous deactivator; such a phenomenon observed in pilot plant studies would not be observed in a commercial-scale operation using a particular first deactivator. Runs 1–14 do, in total, indicate that dimethyl carbonate is a preferred first deactivator.

EXAMPLE II

The procedure of Example I was repeated for a series of runs in sequence, except that the mole ratio of second deactivator (calcium caprylate/caprate) to the chlorine plus alkyl radicals in the catalyst was 0.35:1. In addition, the measurement of colour was made on individual plaques, usually eight in number, using a white background.

The results obtained are shown in Table II.

TABLE II

| Run No. | First Deactivator | Ratio* | Colour L value | Colour b value |
|---|---|---|---|---|
| 17 | diethyl carbonate | 0.35 | 87.4 | 2.33 |
| 18 | dimethyl carbonate | 0.35 | 87.0 | 2.40 |
| 19 | carbon dioxide | 1.09 | 87.3 | 2.28 |
| 20 | water | 0.53 | 87.6 | 2.14 |
| 21 | diethyl carbonate | 0.35 | 87.5 | 2.14 |
| 22 | dimethyl carbonate | 0.35 | 87.2 | 2.12 |
| 23 | carbon dioxide | 1.09 | 87.2 | 2.37 |

EXAMPLE III

The procedure of Example II was repeated using calcium 2-ethylhexanoate as second deactivator and a molar ratio of second deactivator to chlorine plus alkyl radicals in the catalyst of 0.25:1.

The results obtained are shown in Table III.

TABLE III

| Run No. | First Deactivator | Ratio* | Colour L value | Colour b value |
|---|---|---|---|---|
| 24 | water | 0.53 | 86.5 | 1.97 |
| 25 | diethyl carbonate | 0.35 | 87.1 | 1.81 |
| 26 | dimethyl carbonate | 0.35 | 87.1 | 1.80 |
| 27 | carbon dioxide | 1.09 | 87.0 | 2.00 |

The results of Table II and III show that the polymer has similar colour in all runs, under the polymerization conditions and sequence of first deactivators used. From Example I dimethyl carbonate is a preferred deactivator with respect to obtaining a low level of isomerization of the comonomer.

EXAMPLE IV

Over a period of approximately one year, more than two hundred tests were conducted using a Scouting Unit semi-works scale continuous polymerization apparatus to measure the effect of catalyst deactivator on the colour of polymer in a process for the homopolymerization of ethylene. The same procedure was used in all tests, apart from the changes in deactivator and additives discussed below. The data presented in this example is statistically more valid, with substantially reduced probability of experimental error resulting from run-to-run variations in data, than the data presented in the previous examples.

The procedure used was as follows: In all tests, the catalyst was prepared by in-line mixing of (i) a solution of titanium tetrachloride (0.5 mmoles/liter) and vanadium oxytrichloride (0.5 mmoles/liter) in cyclohexane with (ii) a solution of 1.9 mmoles/liter of diethyl aluminum chloride in cyclohexane, the atomic ratio of aluminum to titanium plus vanadium being 1.67:1. After about 20 seconds, a stream of hot cyclohexane was injected into the catalyst mixture, the resultant stream having a temperature of 210° C. The stream was maintained at this temperature for one minute. The catalyst thus obtained was fed into the reactor described hereinabove. A co-catalyst of triethyl dimethyl siloxalane was also fed to the reactor; the co-catalyst was used as a 4 mmole/liter solution in cyclohexane and the rate of feed was the same as that for the solution of titanium tetrachloride/vanadium oxytrichloride. The monomer fed to the reactor was ethylene. The temperature of the effluent passing from the reactor was 235° C. and the mold-up time of the solution in the reactor was 3.5 minutes. The reactor effluent was treated using the procedure detailed under "Measurement of Polymer Colour" hereinabove; the measurement of the "a" and "b" colour values was carried out according to the procedure described therein.

Two series of runs were conducted. In the first series, the first deactivator was carbon dioxide and in the second series the deactivator was dimethyl carbonate. Within each series of runs, runs were conducted using calcium 2-ethyl hexanoate as the second deactivator and using calcium caprylate/caprate as the second deactivator. In addition, with each combination of first and second deactivators, runs were conducted without addition of antioxidant to the polymer, with addition of antioxidant to the polymer and with addition of a mixture of antioxidant and ultraviolet stabilizer to the polymer. In order to reduce the random effects of experimental error on the results obtained, data on polymer colour for each combination of deactivators and additives, if any, was analyzed statistically to a 95% confidence level.

The antioxidant used was 1840 ppm (polymer basis) of a 3:2 mixture by weight of 3-(3',5'-di-tert. butyl-4'hydroxy phenyl) phosphite and tris (2,4-di-tert. butyl phenyl) phosphite. The antioxidant/UV stabilizer was a mixture of 1840 ppm (polymer basis) of the antioxidant mixture described above plus 3600 ppm (polymer basis) of a 3:1 mixture by weight of a hindered amine stabilizer available as Tinuvin ® 622LD UV stabilizer and a benzophenone stabilizer available as Cyasorb ® 531 UV stabilizer.

The results of the colour of the polymer obtained, reported as "b" values, are given in Table IV.

TABLE IV

| First deactivator | Dimethyl carbonate | Carbon dioxide |
|---|---|---|
| A. Calcium 2-ethyl hexanoate as second deactivator | | |
| No antioxidant | 1.63 ± 0.20 | 2.09 ± 0.14 |
| With antioxidant | 1.81 ± 0.14 | 2.43 ± 0.15 |
| With antioxidant and stabilizer | 3.04 ± 0.29 | 3.42 ± 0.16 |
| B. Calcium caprylate/caprate as second deactivator | | |
| No antioxidant | 2.03 ± 0.11 | 2.35 ± 0.20 |
| With antioxidant | 2.25 ± 0.07 | 2.49 ± 0.07 |
| With antioxidant and stabilizer | 3.40 ± 0.13 | 4.42 ± 0.14 |

The results show that the use of dimethyl carbonate as first deactivator resulted in the manufacture of polymer having more acceptable colour i.e. lower values of "b", than polymer obtained using carbon dioxide as first deactivator. That result was obtained with calcium 2-ethyl hexanoate and with calcium caprylate/caprate as second deactivator.

In addition to the above results, for polymer obtained using calcium caprylate/caprate as second deactivator, the colour of the polymer was also measured in terms of the "a" value, which is a measure of the green hue in a polymer. When carbon dioxide was used as the first deactivator, it was found that the "a" value changed from −1.07 in the absence of antioxidant to −1.96 in the presence of both antioxidant and UV stabilizer, an increase in the colour of the polymer as measured by "a" value of 0.89 units. In contrast, when dimethyl carbonate was the first deactivator, the corresponding data was −1.13 and −1.66, which is an increase in the colour of the polymer as measured by "a" value of only 0.53 units.

The values of "a" and "b" obtained show that polymer obtained with carbon dioxide as first deactivator is substantially more susceptible to the formation of colour in the presence of additives of the type used in polyethylene than is polymer obtained with dimethyl carbonate as first deactivator.

This example illustrates that polymer of commercially acceptable colour may be obtained using dimethyl carbonate as first deactivator, especially using a two-stage deactivation system viz. dimethyl carbonate followed by a salt of an alkaline earth metal.

EXAMPLE V

A series of runs were conducted on a commercial-scale apparatus to test the effects of using dimethyl carbonate as the first deactivator in a solution polymerization process. Catalyst was prepared by reacting a mixture of titanium tetrachloride and vanadium oxytrichloride with diethyl aluminum chloride, heat treating the resultant mixture and then activating with triethyl dimethyl siloxalane. The resultant catalyst was then fed to a reactor, together with cyclohexane solvent. The monomers fed to the reactor were ethylene and butene-1.

The solution passing from the reactor was sequentially treated with dimethyl carbonate and with calcium caprylate/caprate that contained a slight excess of caprylic and capric acids, in order to deactivate the catalyst. Ethylene/butene-1 copolymer was separated from the resultant solution.

Further details and the results obtained are given in Table V.

TABLE V

| Run No. | 28 | 29 | 30 | 31 |
|---|---|---|---|---|
| Deactivator | | | | |
| DMC* | 0.40 | 0.35 | 0.35 | 0.35 |
| Calcium salt** | 1.50 | 1.35 | 1.35 | 1.35 |
| Polymer*** | | | | |
| Butene-1 (%) | 6.3 | 6.6 | 7.0 | 7.0 |
| Density | 0.920 | 0.919 | 0.924 | 0.925 |
| Melt Index | 0.57 | 0.82 | 4.9 | 5.8 |
| Colour | | | | |
| L | 71.5 | 72.0 | 72.8 | 74.0 |
| a | −1.32 | −1.24 | −1.32 | −1.35 |
| b | 2.34 | 1.59 | 2.63 | 4.28 |
| Additives | | | | |
| Run 28 | antioxidant/UV stabilizer/silica | | | |
| Run 29 | antioxidant/silica/slip | | | |
| Run 30 | none | | | |
| Run 31 | UV stabilizer | | | |

*dimethyl carbonate, expressed as moles of dimethyl carbonate per mole of chloride plus alkyl in catalyst
**calcium caprylate/caprate, expressed as moles of calcium caprylate/caprate per mole of chloride plus alkyl in catalyst
***Density in g/cm$^3$, melt index in dg/min, colour measured on Hunter colorimeter as described above.

In Runs 28–31, the amount of catalyst used was maintained at a constant level, apart from the changes necessary in order to manufacture polymer having the density and melt index characteristics specified in Table V. The polymer of Runs 28 and 29 was a commercial polymer of a type intended for use in the manufacture of film using a blown-film process, whereas the polymer of Runs 30 and 31 was a commercial polymer of a type intended for rotational moulding end-uses.

In all Runs except Run 31, the pellets of polymer obtained were treated with a mixture of steam and air to reduce residual solvent; in Run 31, steam only was used. The amount of isomerization of butene-1 to butene-2 varied over the range of about 3–5% by weight during the Runs.

This example illustrates the use of dimethyl carbonate as a first-stage deactivator in a commercial solution polymerization process that was being operated without use of alumina or other adsorbent material to remove deactivated catalyst from the polymer.

We claim:

1. A solution polymerization process for the preparation of high molecular weight copolymers of ethylene and butene-1, said process comprising feeding a monomer mixture of ethylene and butene-1, a coordination catalyst and inert hydrocarbon solvent to a reactor, said catalyst being a coordination catalyst formed from a mixture of titanium tetrachloride and vanadium oxytrichloride, polymerizing said monomer mixture under solution polymerization conditions at a temperature of 105°–320° C. and a pressure of less than 25 MPa, deactivating the catalyst in the solution so obtained by sequentially admixing therewith (a) a minor amount of dimethyl carbonate followed by (b) a solution of a salt of an alkaline earth metal or zinc and aliphatic monocarboxylic acid having 6 to 20 carbon atoms, the amount of said salt being not more than 2.5 moles per mole of halogen plus alkyl radicals in the catalyst, such salt being dissolved in hydrocarbon solvent, separating the hydrocarbon solvent and other volatile matter from the resultant solution and recovering a composition comprising said high molecular weight polymer, the amount of dimethyl carbonate being not more than 2.5 moles per mole of halogen plus alkyl radicals in the coordination catalyst.

2. The process of claim 1 in which the polymerization temperature is in the range 105°–310° C.

3. The process of claim 1 in which the aliphatic monocarboxylic acid of the deactivator of step (b) has 8 to 12 carbon atoms.

4. The process of claim 1 in which the salt of the deactivator of step (b) is a calcium salt.

* * * * *